(12) United States Patent
Seger et al.

(10) Patent No.: US 8,622,201 B2
(45) Date of Patent: Jan. 7, 2014

(54) DEVICE FOR TRANSPORTING OBJECTS

(75) Inventors: Martin Seger, Neumarkt (DE); Johann Huttner, Mallersdorf-Pfaffenberg (DE); Hansjorg Halbo, Maxhutte-Haidhof (DE)

(73) Assignee: Krones AG, Neutraubling (DE)

( * ) Notice: Subject to any disclaimer, the term of this patent is extended or adjusted under 35 U.S.C. 154(b) by 497 days.

(21) Appl. No.: 12/863,216

(22) PCT Filed: Dec. 18, 2008

(86) PCT No.: PCT/EP2008/010844
§ 371 (c)(1),
(2), (4) Date: Dec. 1, 2010

(87) PCT Pub. No.: WO2009/089893
PCT Pub. Date: Jul. 23, 2009

(65) Prior Publication Data
US 2011/0061993 A1    Mar. 17, 2011

(30) Foreign Application Priority Data
Jan. 16, 2008 (DE) .......................... 10 2008 004 775

(51) Int. Cl.
*B65G 21/18*       (2006.01)
(52) U.S. Cl.
CPC ..................................... *B65G 21/18* (2013.01)
USPC ........................ 198/778; 198/347.1; 198/594
(58) Field of Classification Search
USPC ................................ 198/347.1, 594, 778, 812
See application file for complete search history.

(56) References Cited

U.S. PATENT DOCUMENTS

| | | | | |
|---|---|---|---|---|
| 4,413,724 | A | * | 11/1983 | Fellner .......................... 198/594 |
| 4,549,647 | A | * | 10/1985 | Cosse ......................... 198/461.1 |
| 5,413,213 | A | | 5/1995 | Golz et al. |
| 5,772,005 | A | * | 6/1998 | Hansch ......................... 198/594 |
| 6,152,291 | A | * | 11/2000 | Steeber et al. ................ 198/594 |
| 6,230,874 | B1 | * | 5/2001 | Steeber et al. ................ 198/602 |
| 6,241,074 | B1 | * | 6/2001 | Steeber ......................... 198/456 |
| 6,260,688 | B1 | * | 7/2001 | Steeber et al. ............. 198/347.4 |
| 6,382,398 | B2 | * | 5/2002 | Steeber et al. ................ 198/594 |
| 6,523,669 | B1 | * | 2/2003 | Steeber et al. ............. 198/370.01 |
| 6,533,103 | B2 | * | 3/2003 | Hartness et al. .............. 198/594 |
| 6,550,602 | B2 | * | 4/2003 | Steeber et al. ............. 198/347.4 |
| 6,591,963 | B2 | * | 7/2003 | Wipf .......................... 198/347.2 |

(Continued)

FOREIGN PATENT DOCUMENTS

DE       202004012848 U1    3/2005
EP             0581143 A1    2/1994

(Continued)

OTHER PUBLICATIONS

German search report for 10 2008 004 775.9, dated Jun. 26, 2008.

*Primary Examiner* — William R Harp
(74) *Attorney, Agent, or Firm* — Marshall, Gerstein & Borun LLP (57) ABSTRACT

A device for transporting objects having a first conveyor and a second conveyor which are guided via a coiled or spiraling conveyor line at least regionally parallel and at a horizontal distance to one another. The device contains a transfer unit, which can be moved in the gap between the conveyors with the aid of a travel drive, for transferring objects between the first and the second conveyor. The transfer unit supports a third conveyor, which can be driven via a conveyor drive independently of the first and second conveyors.

18 Claims, 7 Drawing Sheets

(56) References Cited

U.S. PATENT DOCUMENTS

| | | | |
|---|---|---|---|
| 6,698,581 B2 * | 3/2004 | Steeber et al. | 198/602 |
| 6,725,998 B2 * | 4/2004 | Steeber et al. | 198/347.4 |
| 7,032,742 B2 * | 4/2006 | Hartness et al. | 198/594 |
| 7,191,896 B2 * | 3/2007 | Hartness et al. | 198/594 |
| 7,219,788 B2 * | 5/2007 | Tuck et al. | 198/347.2 |
| 7,810,629 B2 * | 10/2010 | Kronseder et al. | 198/347.1 |
| 7,823,718 B2 * | 11/2010 | Spencer | 198/594 |
| 8,042,676 B2 * | 10/2011 | Balk | 198/347.1 |
| 2003/0155212 A1 * | 8/2003 | Abert et al. | 198/594 |
| 2010/0116627 A1 * | 5/2010 | Fege | 198/812 |

FOREIGN PATENT DOCUMENTS

| | | | |
|---|---|---|---|
| EP | 1295820 A1 | 3/2003 | |
| EP | 1849725 A1 | 10/2007 | |
| GB | 2300613 A | 11/1996 | |
| WO | WO-2005/073113 A2 | 8/2005 | |
| WO | WO-2005102880 A1 | 11/2005 | |
| WO | WO-2007104377 A1 | 9/2007 | |
| WO | WO 2007123401 A1 * | 11/2007 | B65G 47/51 |

* cited by examiner

DEVICE FOR TRANSPORTING OBJECTS

CROSS-REFERENCE TO RELATED APPLICATION

The present application claims the benefit of priority of International Patent Application No. PCT/EP2008/010844, filed Dec. 18, 2008, which application claims priority of German Application No. 102008004775.9, filed Jan. 16, 2008. The entire text of the priority application is incorporated herein by reference in its entirety.

FIELD OF THE DISCLOSURE

The disclosure relates to a device for transporting objects such as the type used for transferring objects between two different conveyors.

BACKGROUND

Such a device is known from DE 20 2004 012 848 U1. The known device contains a first and a second conveyor which run horizontally parallel with respect to each other and in different directions. The conveyors are embodied as belt conveyors and in particular consist of supporting plates connected to each other via hinges on which objects, such as bottles of plastics or the like, empty or filled, stand stably. Between the two conveyors, a transfer unit is arranged which, driven by an external travel drive, can move along the conveyors and relative with respect to them and takes care that objects can be exchanged between the first and the second conveyor. To this end, a third conveyor and a conveyor drive for the third conveyor are arranged on the transfer unit, of which the structural embodiment is identical to the first and the second conveyor. This third conveyor continuously runs on the transfer unit and alternately comes into transferring contact with the first and the second conveyor. Each conveyor runs on its own supporting rail which takes care that the conveyors can run at the same level.

From WO 2005/102880, a conveyor/storage means with a first and a second conveyor which are at least regionally guided parallel with respect to each other and at a distance one next to the other is known. The two conveyors are arranged in a coiled manner or as conveyor tower or spirally in the plane. To be able to transfer objects between the conveyors, a slide can be traveled between the conveyors on which a guiding means in the form of a deflector and guiding surface is arranged. The guiding means projects into the first as well as into the second conveyor, such that the articles can be shifted over from the conveyor conveying towards the guiding means to the conveyor moving away from the guiding means. The slide is driven via the drive of the first and the second conveyor and runs on a guide which preferably also supports the drive for the slide, for example in the form of a belt or a chain or the like. The guide is arranged centrically between the two conveyors.

From EP 581 143, a conveyor means is known which is in particular designed for conveying cigarettes. The conveyor means contains a conveyor tower with first and second conveyors arranged in a coiled manner which are arranged vertically one above the other in one embodiment. At the outer periphery of the conveyor means, a belt wagon is guided and driven via a rotating arm, which on the one hand supports a deflection point between the two conveyors and on the other hand comprises a withdrawal conveyor consisting of two conveyor belts touching the conveying side of the conveyor on both sides. The belts of the withdrawal conveyor lift the stream of articles conveyed by the conveyor from its conveying side and move it tangentially to the coil to a deflection zone embodied as a vertical conveyor line and from there to a return conveyor that places the deflected articles onto the second conveyor.

It is furthermore known, for example from WO 2005/073113, to arrange a continuous conveyor means divided into a first (conveying side) and a second (slack side) conveyor parallel to each other in a coiled and ascending and descending manner so that a conveyor tower is formed. The conveying side and the slack side can be driven independently with respect to each other. To here have the possibility of modifying the ratio of the capacities of the conveyors, the deflection points of the conveyors are, in the known device, arranged on a slide which can be traveled by the drive of the two sides such that the length ratio between the conveyor side and the slack side changes.

SUMMARY OF THE DISCLOSURE

An aspect underlying the disclosure is to provide a structurally simple and reliably effective device for transporting objects.

The disclosure is based on the finding that with a transfer unit which is provided with a separate (third) conveyor that can be driven independently of the first and the second conveyor, transfer can take place, with conveyors situated next to each other and guided in a coiled or spiral manner, in a structurally simple manner despite the difference of the radius of curvature between the two conveyors.

By the embodiment of the supporting rails such that two adjacent conveyors each, i.e. the third with the first or the third with the second conveyor, share one supporting rail, on the one hand the work required for the construction if two adjacent supporting rails have to be aligned at the same level with respect to each other is reduced, particularly involving a lot of work in case of conveyors guided in a coiled or spiral manner. Moreover, it is much easier to observe wear on the mutual supporting rails than would be the case with individual rails, as the mutual rails are exposed at least on the side of the transfer unit outside the transfer unit and wear can be well observed there. Preferably, at least the running surface of the supporting rail is embodied as wearing part and antifrictional.

Furthermore, a travel drive for the motion of the transfer unit along the first and the second conveyor is provided which in the preferred embodiment is also carried by the transfer unit, so that complex tracking of drive means can be eliminated. For such a travel drive, a gear drive on the transfer unit that cooperates with a stationary toothed rack is particularly suited.

The transfer unit, however, can also be driven by a stationary travel drive which preferably moves a catch fixed to the transfer unit.

The transfer unit is held by a supporting means which in a preferred embodiment contains rollers running on a running surface. In case of coiled conveyor lines, the supporting means can be located at the same level as the third conveyor. In particular for third conveyors embodied for a suspended conveyance, it is, however, preferred to provide the support and transfer at different decks, as in this manner a suspended conveyance can be structurally and procedurally realized much easier, or only becomes possible at all by this measure.

BRIEF DESCRIPTION OF THE DRAWINGS

In the following, embodiments of the disclosure are illustrated more in detail with reference to the drawings. In the drawings.

DETAILED DESCRIPTION OF THE PREFERRED EMBODIMENT

Figure 1:
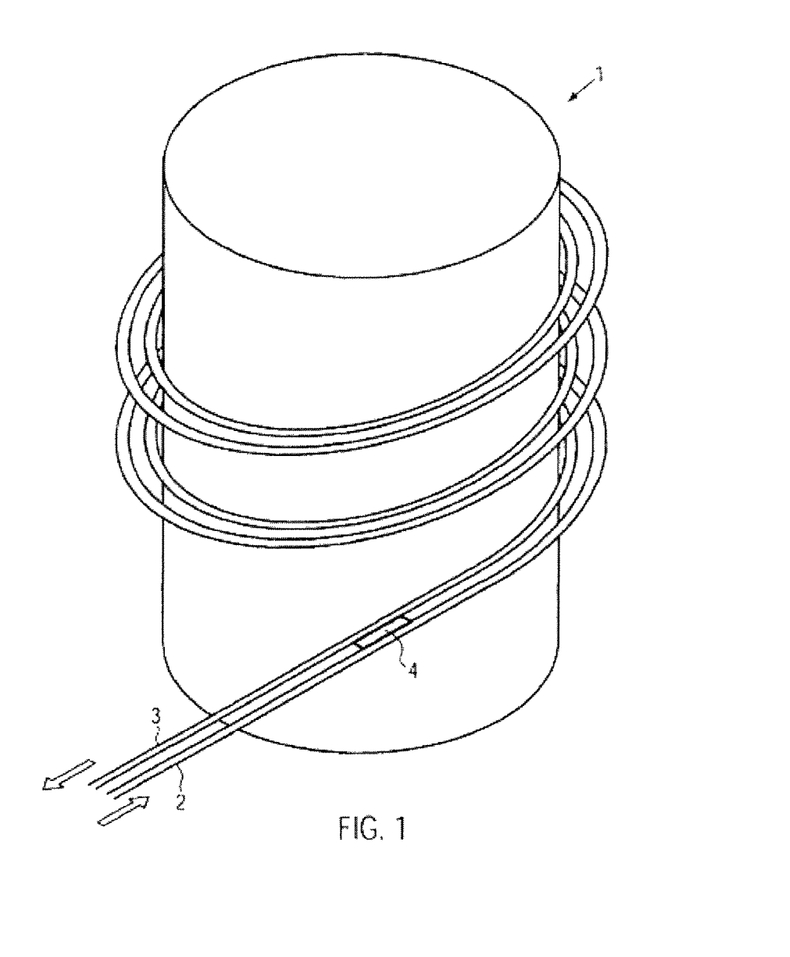
FIG. 1 shows a perspective, schematic representation of a device according to the disclosure.
Figure 2:
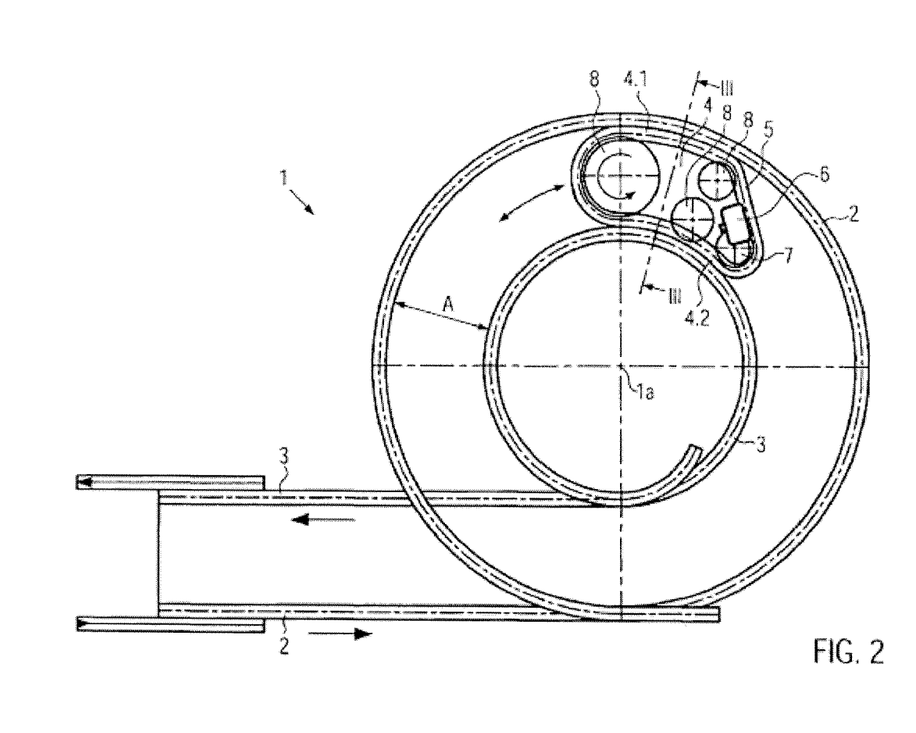
FIG. 2 shows the plan view onto FIG. 1.

FIGS. 1 and 2 show in a highly schematized, perspective representation, a device 1 for transporting objects. The device 1 is particularly suited for the transport and intermediate storage of beverage containers, such as for example bottles and in particular plastic bottles. The device 1 contains a first conveyor 2 and a second conveyor 3 which are arranged at a horizontal distance A and parallel to each other and guided via a spiraling conveyor line, or, as represented, a conveyor line ascending and descending in a coiled manner about an axis of curvature 1a. In the represented embodiment, the device 1 is embodied as conveyor, intermediate storage and/or buffer tower, where the first conveyor 2 is embodied as ascending run-in and the second conveyor 3 as descending run-out.

In the represented embodiment, the two conveyors 2, 3 are embodied for an upright conveyance of objects, such as for example bottles, and contain correspondingly adjusted, belt-like conveyors with a base surface. Conveyors consisting of a circulating chain having a plurality of individual base plates 2a, 3a connected to each other via hinged joints, as they are used, for example in WO 2005/073113, are particularly suited. Such conveyors are well-known and do not have to be illustrated more in detail herein.

To increase or reduce the conveyor line between the run-in and the run-out, which is accomplished depending on the number of objects to be transported or stored intermediately, a transfer unit 4 in the form of a slide is provided between the conveyors 2, 3 running in parallel. The transfer unit 4 is moved in the gap A between the two conveyors 2, 3 and parallel and relative to the movement of the conveyors 2, 3. The transfer unit 4 is here in transferring contact with both conveyors 2, 3 and to this end contains a third conveyor 5 which preferably is also a belt-like continuous conveyor provided with base plates 5a of the type also employed for the first and the second conveyor 2, 3.

The transfer unit 4 furthermore supports a conveyor drive 6 in the form of a motor which rotates a drive wheel 7 for driving the third conveyor 5. The conveyor drive 6 is guided along with the movement of the transfer unit 4. Furthermore, various deflection rollers 8 are provided which impart a non-circular, preferably long stretched-out contour to the third conveyor 5, forming a first transfer line 4.1 with the first conveyor 2 and a second transfer line 4.2 with the second conveyor 3, in which the third conveyor 5 runs parallel, in the same direction and very close to the first or second conveyor 2, 3 no that transfer can take place. Here, the transfer line which is situated externally with respect to the axis of curvature of the conveyor line, in the represented embodiment the first transfer line 4.1, is shorter than the internally situated transfer line 4.2. The transfer is accomplished by guides or the like which are well-known in prior art and do not have to be illustrated again here.

Figure 3:
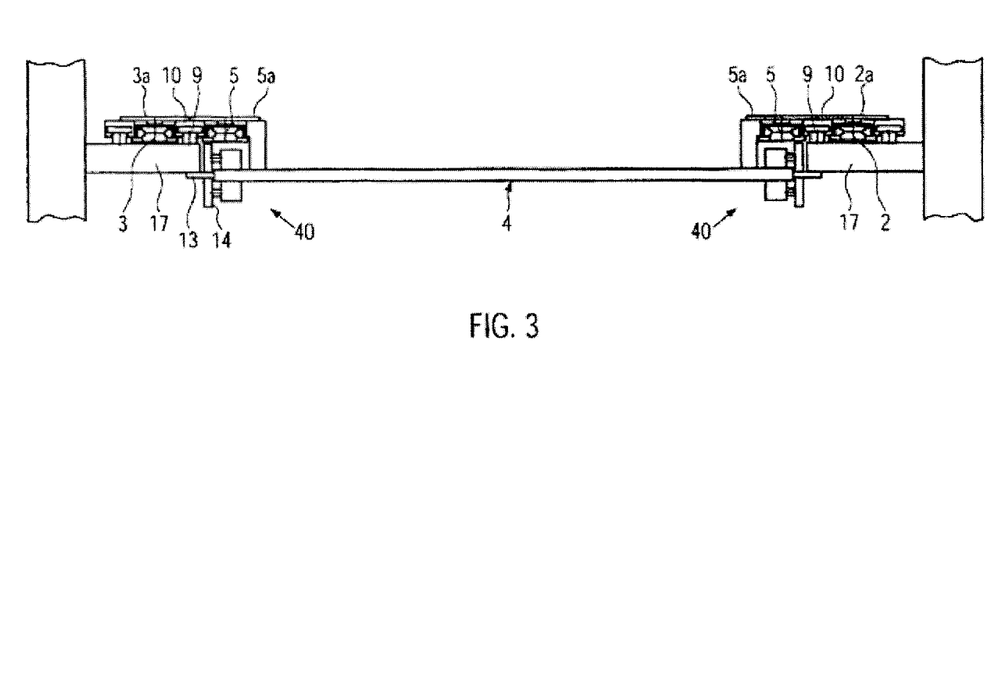
FIG. 3 shows an enlarged section of FIG. 2.
Figure 4:
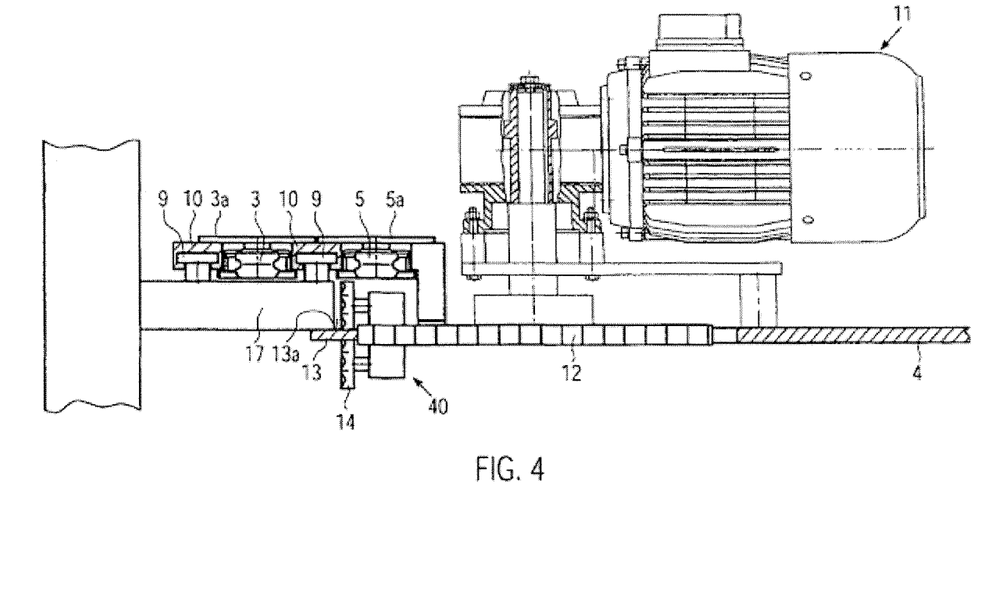
FIG. 4 shows an enlarged detail at the transition between the transfer unit and the conveyor in a first embodiment.

As FIG. 3 and the enlarged representation in FIG. 4 show, the first, second and third conveyors run at the same level, i.e. they are oriented to be aligned next to each other in the horizontal plane with their base plates 2a or 3a or 5a, respectively. The conveyors 2, 3 and 5 run on supporting rails 9 which are embodied as wearing parts and antifrictional. To this end, the supporting rails 9 preferably contain a friction lining 10 which is preferably exchangeable and covers the upper side of the supporting rail 9 facing the lower side of the plates 2a, 3a, 5a, as well as the sides of the supporting rail 9a facing the respective contacting conveyor 2 and 5 or 3 and 5, respectively. The friction lining 10 preferably consists of suited plastics.

The supporting rails 9 are also coiled and stationarily arranged at a bearing structure 17 for the first and/or the second conveyor 2, 3, such that two adjacent conveyors each, i.e. the first conveyor 2 and the third conveyor 5 or the second conveyor 3 and the third conveyor 5, share the supporting rail 9 located between them. This is advantageous in particular in case of conveyors guided in a coiled manner, as in this manner, wear becomes uniform and can be detected more easily. At the external sides facing away from the transfer unit 4, the same supporting rails can be employed to facilitate the storage of the wearing linings 10, or rails having a different design can be provided.

The transfer unit 4 can be traveled bidirectionally by means of a travel drive 11 in the gap A between the first and the second conveyor 2, 3 and independently of the motion of the first and the second conveyor 2, 3, in the direction of the double arrow. In the embodiment according to FIG. 4, the travel drive 11 is accommodated on the transfer unit 4 and taken along by the transfer unit 4. The travel drive 11 designed as motor contains a gear drive with a driven gearwheel 12 that meshes with a stationary toothed rack 13. The toothed rack 13 is, as shown in FIG. 4, arranged at the bearing structure 17 underneath the transition between one of the conveyors, in the represented embodiment the second conveyor 3, and the transfer unit 4, i.e. the third conveyor 5, and it is coiled analogously to the conveyors.

The transfer unit 4 is held by a supporting means 40 preferably assigned to the first as well as to the second conveyor 2, 3, which in the represented embodiment contains track rollers 14 and at least one running surface 13a, where the toothed rack 13 can serve as running surface at the side of the one conveyor, and a similar rack is assigned to the other conveyor. In the represented embodiment, both racks are embodied as web having a rectangular cross-section, wherein the toothed rack 13 a narrow longitudinal side is provided with the tooth pitch and in both racks the upper and lower sides are embodied as running surfaces 13a for at least one track roller 14 each.

Figure 5:
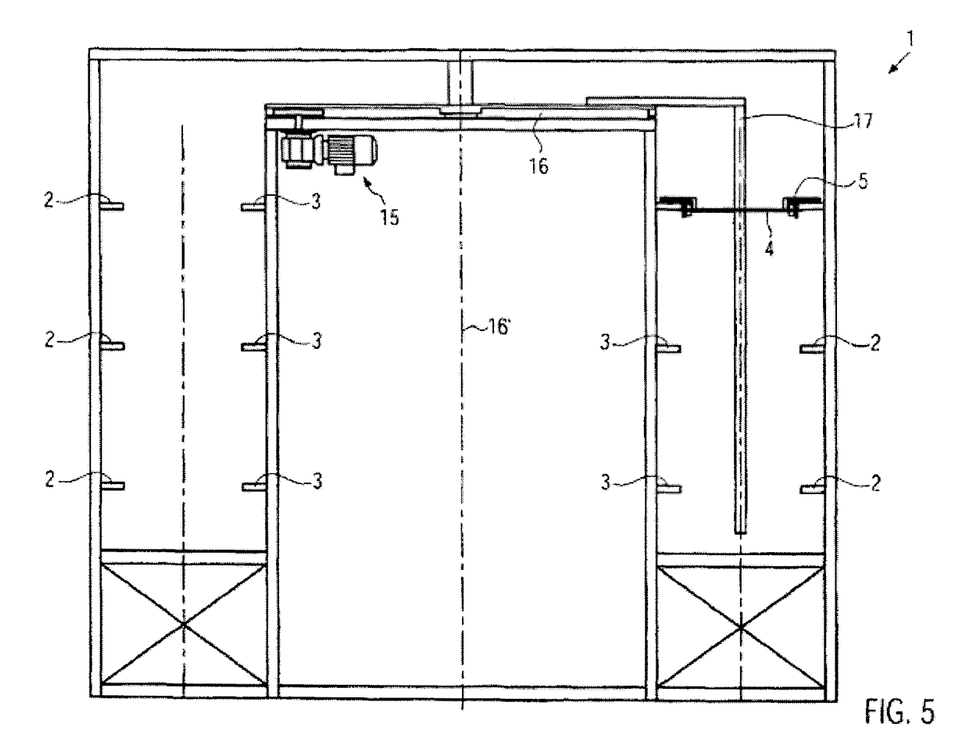
FIG. 5 shows a longitudinal section through a second embodiment of the disclosure in a schematized representation.

The drive of the transfer unit 4, however, can also be accomplished by a stationary travel drive 15, as it is represented, for example, in FIG. 5. The travel drive 15 shown in FIG. 5 in turn contains a motor which rotates a wheel 16 forward and backward about an axle 16' which is coincident with the axis of curvature 1a of the first and the second conveyor 2, 3. A catch 17 in the form of a rigid rod or connecting brace is fixed to the wheel 16, which preferably projects from above through the transfer unit 4 outside the area of motion of the third conveyor 5, for example grips through an opening in the transfer unit embodied as guide bush or the like and is thereby vertically guided in the transfer unit 4, and takes along the transfer unit 4 into the desired direction along the coiled travel as soon as the wheel 16 is rotated into the corresponding direction. The catch here extends across several coil levels of the conveyors, preferably across all of them.

Figure 6:
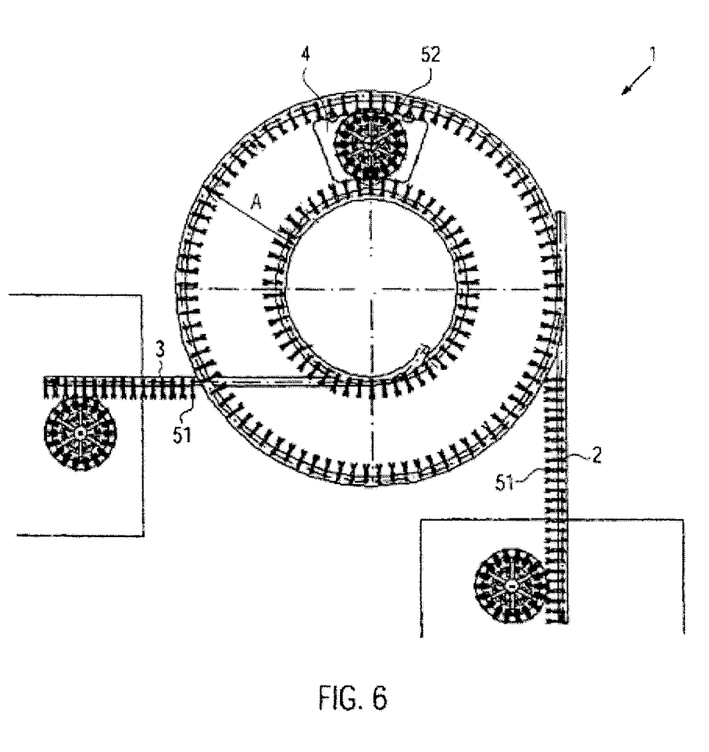
FIG. 6 shows a plan view onto a further embodiment of a device according to the disclosure in a highly schematized representation.
Figure 7:
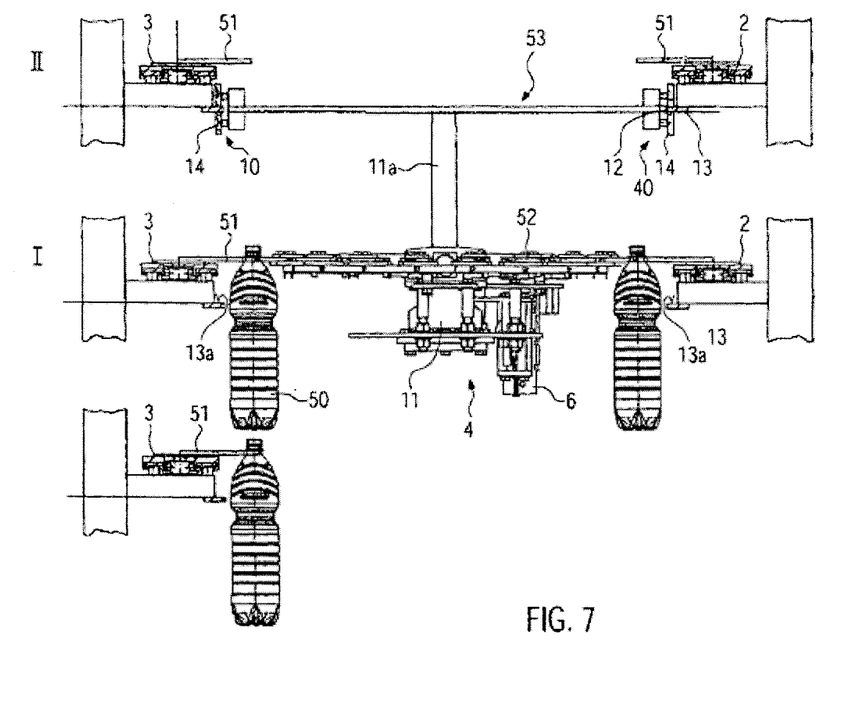
FIG. 7 shows the section VII-VII of FIG. 6.

In FIGS. 6 and 7, one can see a further embodiment of a device according to the disclosure 1 where the same or comparable components are designated with the same reference numerals and are not illustrated again.

The device 1 contains a first and a second conveyor which are here embodied for a suspended conveyance of objects, where bottles 50 are shown, and comprise corresponding mountings 51 of a conventional type, for example mountings of the type gripping with fork-like ends under a collar provided at the neck of the bottle for this purpose, or controllable gripping pliers known per se. The mountings 51 project from the conveyors 2, 3 such that the receiving ends of the mountings 51 project into the gap A in the area of the conveyor line guided in a coiled manner.

The device 1 furthermore contains a transfer unit 4 moving in the gap A between the first and the second conveyor 2, 3. The transfer unit 4 contains a third conveyor 52 which in turn is embodied as continuous conveyor. In the represented embodiment, the third conveyor 52 is embodied as conveyor wheel at the circumference of which the same mountings 51 as in the first and the second conveyor 2, 3 project essentially horizontally. The pitch, i.e. the distance of the mountings 51, on the first and the second conveyor 2, 3 and the third conveyor 52 is adjusted such that between the first conveyor 2 and the third conveyor 52 as well as the third conveyor 52 and the second conveyor 3, a position-specific transfer can take place. The transfer can be accomplished in a well-known manner, for example by the fork-like ends overlapping, or by deflectors or guiding surfaces or other transfer means being provided.

On the transfer unit 4, furthermore the conveyor drive 6 for driving the third conveyor 52 and the travel drive 11 for moving the transfer unit 4 also move along and relative to the first and second conveyor 2, 3.

The transfer unit 4 is in turn supported via a supporting means 40 each in the area of the first and the second conveyor 2, 3 which is similar to the supporting means 40 of the above embodiments with respect to its construction and function. The supporting means 40, however, is arranged at an arm 53 of the transfer unit 4 having a vertical distance to the third conveyor 52 adapted to the vertical distance of the coils of the first and the second conveyor 2, 3. The travel drive 11 is in the represented embodiment arranged at the third conveyor 52, connected to the arm 53 via a motor shaft 11a and drives the gearwheel 12 which meshes with the toothed rack 13 for a travel drive of the transfer unit 4 in the already described manner, the toothed rack 13 being assigned to at least one of the two stationary conveyors 2, 3. The arm 53 furthermore supports the track rollers 14 of the supporting means 40.

The arm 53 is dimensioned such that the supporting means 40 and the travel drive via the gearwheel 12 and the toothed rack 13 on the one hand and the transfer between the third and the first or second conveyor on the other hand take place at two different decks I and II of the conveyor line guided in a coiled way. In the represented embodiment, the two decks I and II are situated adjacent one upon the other, where the transfer takes place at the lower deck I and the support as well as the drive at the deck II located thereabove.

To ensure transfer of the bottles from the first conveyor 2 via the inserted third conveyor 52 to the second conveyor 3 with a precise synchronization of the positions, the third conveyor 52 can be engaged at least with one of the two other conveyors 2 and 3 in a driving manner, preferably with a form fit via suited catches, teeth or the like. If the third conveyor 52 is mechanically synchronized at least with one of the two other conveyors, the precise position control of the travel drive 11 for a bottle transfer with precise positioning from a mounting 51 of a conveyor to that of an adjacent conveyor is less problematic, i.e. the position control of the travel drive is facilitated thereby. If the third conveyor is mechanically synchronized with both adjacent conveyors 2 and 3, a separate motive travel drive can be possibly dispensed with.

In variation to the described and drawn embodiments, the disclosure can also be employed in differently constructed conveyors. The travel drive of the transfer unit can also be accomplished in a conventional way, for example via a tow rope. If the travel drive is taken along on the transfer unit, it can also be realized as frictional drive or also via a tow rope that can be wound and unwound. It can be easily seen that the supporting rails between the conveyors can also be mutually used between adjacent conveyors if these are employed in devices which comprise a straight conveyor line in addition or as an alternative to the helical conveyor line. It is furthermore clear that a transfer unit can take along its own travel drive even if the transfer unit is employed on a straight conveyor line in addition or as an alternative. It is furthermore possible to also drive the transfer unit which is effective at two decks via a catch of a stationary drive and to utilize the second deck only for supporting the transfer unit.

The invention claimed is:

1. Device for transporting objects, comprising:
   a first conveyor, a second conveyor, and a coiled or spiraling conveyor line guiding the first and second conveyors at least regionally parallel and at a horizontal distance (A) to one another, wherein a gap is provided between the first conveyor and the second conveyor;
   a transfer unit for transferring objects between the first conveyor and the second conveyor;
   a travel drive for moving the transfer unit along the gap;
   a third conveyor supported by the transfer unit; and
   a conveyor drive driving the third conveyor independently of the first conveyor and the second conveyor,
   wherein the transfer unit comprises a supporting means with track rollers supported on a running surface, and
   wherein the transfer unit extends over two decks of the coiled conveyor line, which are situated adjacent one upon the other, and wherein the transfer by the third conveyor takes place at one of the decks and the support by the supporting means takes place at the other one of the decks.

2. Device according to claim 1, wherein the third conveyor is a continuous conveyor.

3. Device according to claim 1 wherein the conveyor drive for the third conveyor is mounted on the transfer unit.

4. Device according to claim 1, wherein the travel drive is mounted on the transfer unit for a movement of the transfer unit along the first conveyor and the second conveyor.

5. Device according to claim 1, further comprising a stationary toothed rack, and wherein the travel drive comprises a gear drive cooperating with the toothed rack.

6. Device according to claim 1, wherein the travel drive for the transfer unit is stationary.

7. Device according to claim 6, further comprising a catch connected to the transfer unit and moved by the stationary travel drive.

8. Device according to claim 1, wherein the third conveyor comprises one of a conveyor star or a conveyor wheel.

9. Device according to claim 1, wherein the third conveyor comprises a conveyor chain with base surfaces for an upright conveyance of the objects.

10. Device according to claim 1, wherein the third conveyor comprises mountings for a suspended conveyance of the objects.

11. Device according to claim 1, further comprising a catch in the form of a rigid rod or connecting brace, movable along the coiled conveyor line for traversing the third conveyor, wherein the catch extends across several decks of the coiled conveyor line.

12. Device according to claim 11, and wherein the rod-like catch can be positioned by a stationarily arranged drive.

13. Device for transporting objects, comprising:
a first conveyor, a second conveyor, and a coiled or spiraling conveyor line guiding the first and second conveyors at least regionally parallel to and at a horizontal distance (A) from one another, wherein a gap is provided between the first conveyor and the second conveyor;
a transfer unit for transferring objects between the first conveyor and the second conveyor;
a travel drive for moving the transfer unit along the gap;
a third conveyor supported by the transfer unit;
a conveyor drive driving the third conveyor independently of the first conveyor and the second conveyor; and
further comprising supporting rails, on which the first conveyor and the second conveyor run at least regionally, wherein the third conveyor shares at least one of the supporting rails with the first conveyor, second conveyor, such that the first conveyor, second conveyor, and third conveyor run on the same level, each of the first conveyor, the second conveyor, and the third conveyor having a circulating chain having a plurality of individual base plates connected to each other via hinged joints.

14. Device according to claim 13, wherein each supporting rail comprises a running surface embodied to be anti-frictional and as a wearing part.

15. Device according to claim 13, wherein the travel drive is mounted on the transfer unit for a movement of the transfer unit along the first conveyor and the second conveyor.

16. Device for transporting objects, comprising:
a first conveyor, a second conveyor, and a coiled or spiraling conveyor line guiding the first and second conveyors at least regionally parallel and at a horizontal distance (A) to one another, wherein a gap is provided between the first conveyor and the second conveyor;
a transfer unit for transferring objects between the first conveyor and the second conveyor;
a travel drive for moving the transfer unit along the gap;
a third conveyor supported by the transfer unit; and
a conveyor drive driving the third conveyor independently of the first conveyor and the second conveyor,
wherein the third conveyor has a noncircular contour, seen in a plan view, and has a first transfer line running in parallel to the first conveyor, and a second transfer line running in parallel to the second conveyor.

17. Device according to claim 16, wherein the first transfer line which run in parallel to the conveyor is situated outside with respect to the coiled or spiraling conveyor line and is shorter than the internally situated second transfer line.

18. Device according to claim 16, wherein the travel drive is taken along on the transfer unit for a movement of the transfer unit along the first conveyor and the second conveyor.

* * * * *